United States Patent
Choi

[11] Patent Number: 6,005,836
[45] Date of Patent: Dec. 21, 1999

[54] OPTICAL PICKUP TILT ADJUSTABLE DISK PLAYER INCLUDING TILT ADJUSTABLE UNIT FOR CONTROLLING THE TILT OF A MOTOR PLATE

[75] Inventor: Han-kook Choi, Suwon, Rep. of Korea

[73] Assignee: Samsung Electronics Co., Ltd., Kyungki-do, Rep. of Korea

[21] Appl. No.: 08/877,888

[22] Filed: Jun. 18, 1997

[30] Foreign Application Priority Data

Jun. 25, 1996 [KR] Rep. of Korea ............. 96-23675

[51] Int. Cl.⁶ ............. G11B 17/30; G11B 23/00
[52] U.S. Cl. ............. 369/219; 369/258
[58] Field of Search ............. 369/44.14, 44.15, 369/44.16, 223, 208, 258, 261, 263, 264, 266, 270, 219; 359/822

[56] References Cited

U.S. PATENT DOCUMENTS

| | | | |
|---|---|---|---|
| 4,788,677 | 11/1988 | Ikedo et al. | 369/223 |
| 5,008,873 | 4/1991 | Tanaka et al. | 369/44.14 |
| 5,182,739 | 1/1993 | Kime et al. | 369/44.15 |
| 5,267,089 | 11/1993 | Yamamoto et al. | 359/822 |
| 5,552,948 | 9/1996 | Yokota et al. | 360/105 |
| 5,796,707 | 8/1998 | Kim | 369/219 |

FOREIGN PATENT DOCUMENTS 61-061268 3/1986 Japan .
1-279459 11/1989 Japan .

*Primary Examiner*—David L. Ometz
*Assistant Examiner*—Angel Castro
*Attorney, Agent, or Firm*—Sughrue, Mion, Zinn Macpeak & Seas, PLLC

[57] ABSTRACT

An optical pickup tilt adjustable disk player is provided, including a spindle motor fixed on a motor plate which is adjustably attached on a deck and a tilt adjusting unit which is installed between the spindle motor and the deck to adjust the tilt of the spindle motor. The tilt adjusting unit includes a tangential screw and a radial screw for controlling the tilt of the motor plate. Thus, the tilt of an optical pickup can be effectively adjusted by controlling the installation condition of the spindle motor.

6 Claims, 4 Drawing Sheets

OPTICAL PICKUP TILT ADJUSTABLE DISK PLAYER INCLUDING TILT ADJUSTABLE UNIT FOR CONTROLLING THE TILT OF A MOTOR PLATE

BACKGROUND OF THE INVENTION

The present invention relates to a disk player, and more particularly, to a disk player in which the tilt of an optical pickup can be adjusted.

In general, a disk player using a disk as a recording medium, such as a compact disk (CD), a video-CD, a laser disk (LD), a digital video disk (DVD), a CD-ROM, or a DVD-ROM which can store more information on a disk having a limited recording area, has been developed. Accordingly, to store more information on a disk having the same recording area, the width of a recording track of the disk is narrowed and the distance between tracks is decreased. Thus, a highly accurate optical pickup and a deck mechanism corresponding thereto is required to record information on and reproduce information from the high density disk.

To maintain the highly accurate deck mechanism, there should be no tilting of the optical pickup. Tilting causes light to be irradiated from the optical pickup at an angle to a disk. The types of tilt include a radial tilt in which light is irradiated at an angle in a radial direction of the disk and a tangential tilt in which light is irradiated at an angle in a tangential direction of the disk.

Referring to FIG. 1, in a conventional disk player, both ends of a pair of guide rails 3 are fixed to a deck 5 by respective brackets 4 and a spindle motor 6 is fixed to a deck 5 by a screw 7. The spindle motor 6 rotates a disk (not shown) placed on a turntable 2 by rotating the turntable 2. The guide rails 3 guide the optical pickup 1 to move radially with respect to the disk.

In the above structure, when the guide rails 3 are not assembled horizontally with respect to the deck 5 due to the assembly of the brackets 4 or the manufacturing of the brackets 4 themselves, or the spindle motor 6 is not vertically installed perpendicularly with respect to the deck 5, the light emitted from the optical pickup 1 does not accurately hit the disk resulting in an error with the operation of the optical pickup 1.

SUMMARY OF THE INVENTION

To solve the above problem, it is an object of the present invention to provide an optical pickup tilt adjustable disk player by which light emitted from an optical pickup can be irradiated perpendicularly with respect to a disk.

Accordingly, to achieve the above object, there is provided an optical pickup tilt adjustable disk player including: a deck; a motor plate to which a spindle motor is fixed; at least one pressing screw which is coupled to the deck by passing through the motor plate; a spring which is disposed between the pressing screw and the motor plate to bias the motor plate toward the deck; and tilt adjusting screws screw-threaded to the deck and of which end portions contact side portions of the bottom surface of the motor plate, for lifting and lowering the side portions of the motor plate with respect to the deck.

It is preferable that a hinge protrusion contacting the bottom surface of the motor plate is formed on the deck so that the side portions of the motor plate are lifted or lowered by pivoting around a contact point with the hinge protrusion.

Also, it is preferable that embossments are formed on the bottom surface of the motor plate, each of which contact the respective end portions of the tangential screw and the radial screw.

BRIEF DESCRIPTION OF THE DRAWINGS

The above object and advantages of the present invention will become more apparent by describing in detail a preferred embodiment thereof with reference to the accompanying drawings in which.

DETAILED DESCRIPTION OF THE INVENTION

Figure 1:
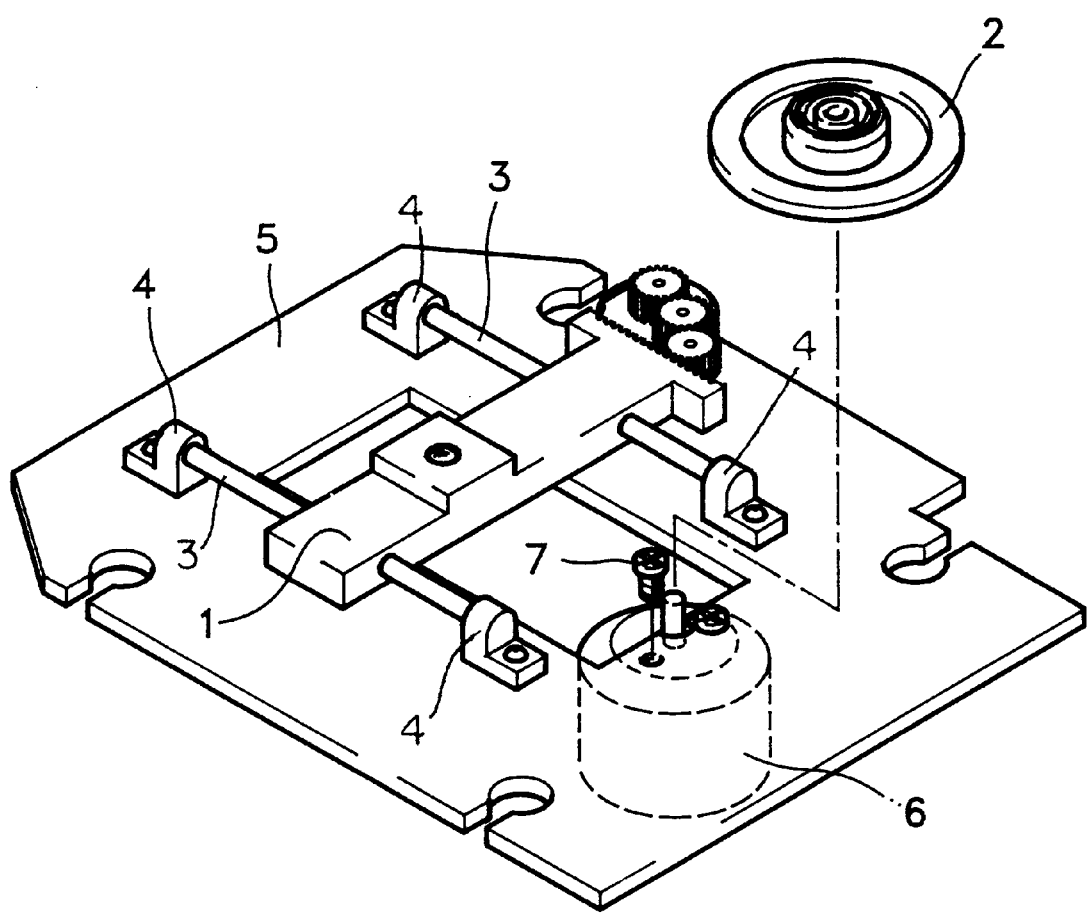
FIG. 1 is a perspective view illustrating a deck structure of a conventional disk player.
Figure 2:
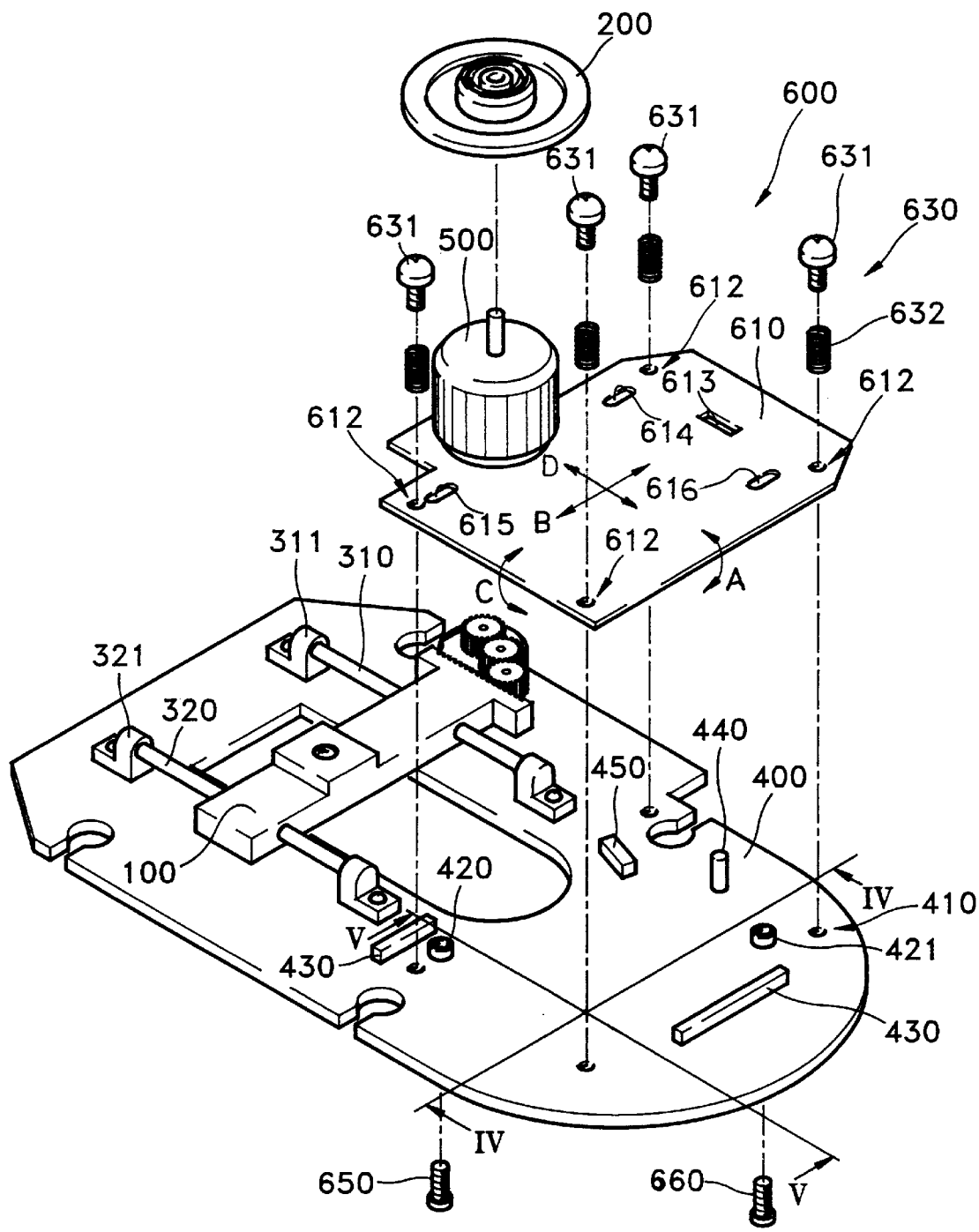
FIG. 2 is an exploded perspective view illustrating an optical pickup tilt adjustable disk player according to the present invention.

Referring to FIG. 2, in the disk player according to the present invention, the optical axis of the light irradiated from an optical pickup 100 to a disk (not shown) placed on a turntable 200 is prevented from being at an angle by effectively adjusting the slant of a spindle motor 500 using a tilt adjusting means 600.

First and second guide rails 310 and 320 are fixed to the deck 400 by brackets 311 and 321, and the optical pickup 100 is installed so as to reciprocate along the first and second guide rails 310 and 320. The spindle motor 500 is installed above the deck 400 by the tilt adjusting means 600.

The tilt adjusting means 600 includes a motor plate 610 to which the spindle motor 500 is fixed, an elastic coupling means 630 which couples the motor plate 610 to the deck 400 while it elastically biases the motor plate 610 toward the deck 400, and adjusting screws, comprised of a tangential screw 650 and a radial screw 660, which are coupled to the deck 400 and lift desired ends of the motor plate 610 from the deck 400. The tangential screw 650 is screw-coupled to a tangential screw hole 420 formed in the deck 400 and adjusts the tilt of the motor plate in a tangential direction. The radial screw 660 is screw-coupled to a radial screw hole 421 provided to the deck 400 and adjusts the tilt of the motor plate in a radial direction. The tangential screw hole 420 is arranged perpendicularly to the radial screw hole 421 with respect to a hinge protrusion 450 formed on the deck 400 which is a pivoting center (forming a right triangle). Thus, as described later, the side portion of the motor plate 610 can be lifted or lowered with respect to the deck 400 while pivoting around the hinge protrusion 450 by rotating the screws 650 and 660.

The elastic coupling means 630 includes a plurality of pressing screws 631 which are coupled to the deck 400 by passing through a plurality of coupling holes 612, respectively, formed in the motor plate 610, and a plurality of springs 632 which are disposed between the pressing screws 631 and the motor plate 610 to bias the motor plate 610 toward the deck 400.

Two phase guiders 430 and a phase protrusion 440 are formed on the deck 400. Each phase guider 430 supports a side portion of the motor plate 610 to prevent movement of the motor plate 610 in the directions indicated by arrow D and the phase protrusion 440 which is inserted into a phase hole 613 formed in the motor plate 610 to prevent movement of the motor plate 610 in the directions indicated by arrow B. That is, the phase guiders 430 and the phase protrusion 440 support the motor plate 610 to prevent a phase shift due to an adjustment of the tilt using the tangential screw 650 and the radial screw 660.

Figure 3:
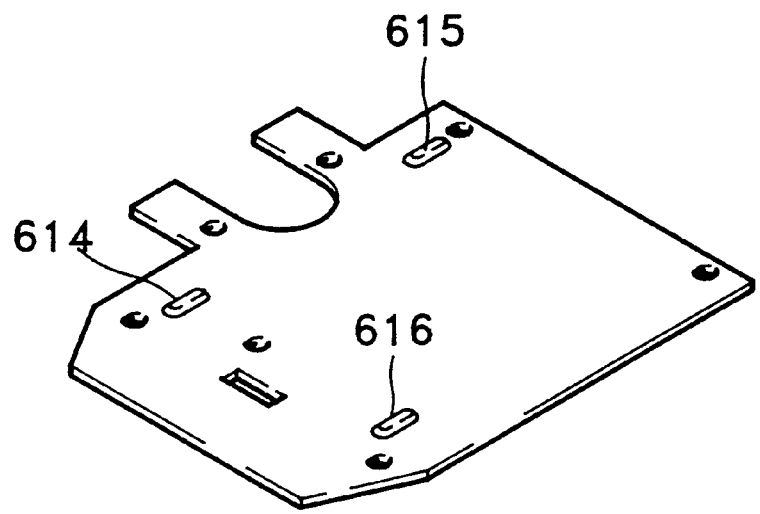
FIG. 3 is a perspective view showing the motor plate shown in FIG. 2.
Figure 4:
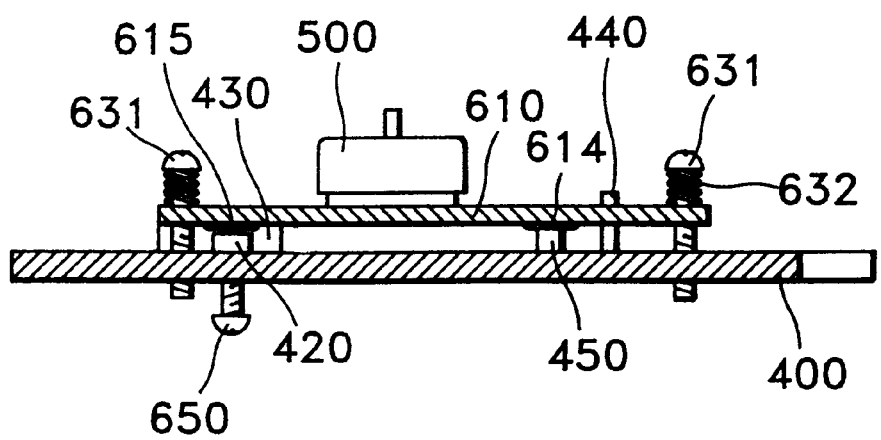
FIG. 4 is a sectional view taken along line IV—IV of FIG. 2 showing a portion of the disk player.

Referring to FIG. 3, a hinge embossment 614, a tangential embossment 615 and a radial embossment 616 are formed to bulge from the bottom surface of the motor plate 610. As shown in FIG. 4, the hinge embossment 614 contacts the hinge protrusion 450 which protrudes from the deck 400, and the tangential embossment 615 contacts the end portion of the tangential screw 650 coupled to the deck 400. The hinge embossment 614 is used as a pivoting center of the motor plate 610 during the adjustment of the tilt in the tangential or radial directions. Also, as shown in FIG. 5, the radial embossment 616 contacts the end portion of the radial screw 660 which is screw-coupled to the deck 400.

The operation of the disk player according to the present invention in which tilt adjustment is possible will now be described with reference to the attached drawings.

Referring to FIGS. 2 and 4, the tangential tilt with respect to the disk is adjusted by rotating the tangential screw 650. When the tangential screw 650 is rotated in one direction, one side of the motor plate 610 is lifted by pivoting around a contact point of the hinge protrusion 450 and the hinge embossment 614. When the tangential screw 650 is rotated in the opposite direction, the side of the motor plate 610 is lowered by pivoting around the contact point since the motor plate 610 is biased toward the deck 400 by the elastic coupling means 630. Thus, the tangential tilt of the motor plate 610 can be adjusted in the directions indicated by arrow C. When the tangential tilt is adjusted by the rotation of the tangential screw 650, horizontal movement of the motor plate 610 is prevented by the phase guider 430 and the phase protrusion 440.

Figure 5:
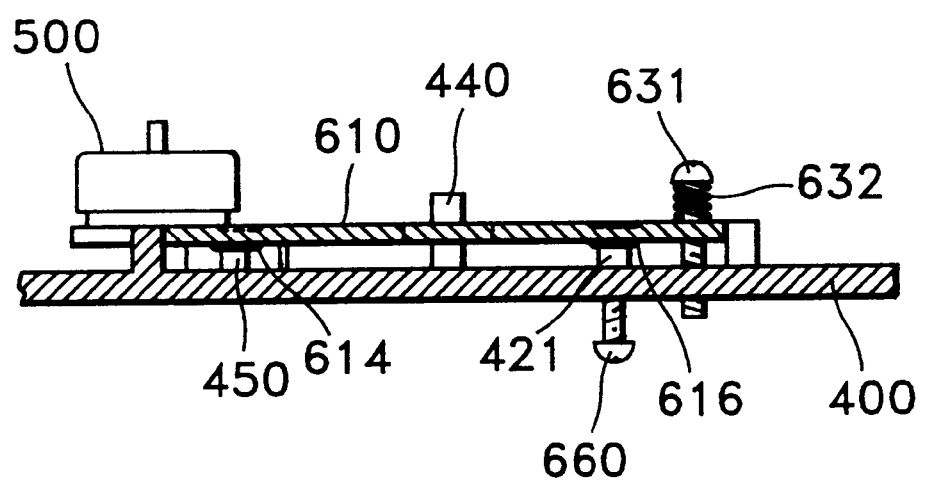
FIG. 5 is a sectional view taken along line V—V of FIG. 2 showing a portion of the disk player.

Referring to FIGS. 2 and 5, the radial tilt with respect to the disk is adjusted by rotating the radial screw 660. When the radial screw 660 is rotated in one direction, the other side of the motor plate 610 is lifted by pivoting around the contact point of the hinge protrusion 450 and the hinge embossment 614. When the radial screw 660 is rotated in the opposite direction, the other side of the motor plate 610 is lowered by pivoting around the contact point since the motor plate 610 is biased toward the deck 400 by the elastic coupling means 630. Thus, the radial tilt of the motor plate 610 can be adjusted in the directions indicated by arrow A. When the radial tilt is adjusted by the rotation of the radial screw 660, the phase is not changed since the movement of the motor plate 610 is restricted by the phase guider 430 and the phase protrusion 440.

As described above, in the optical tilt adjustable disk player according to the present invention, the tilt of the optical pickup can be effectively adjusted by controlling the installation conditions of the spindle motor.

It is noted that the present invention is not limited to the preferred embodiment described above, and it is apparent that variations and modifications by those skilled in the art can be effected within the spirit and scope of the present invention defined in the appended claims.

What is claimed is:

1. An optical pickup tilt adjustable disk player comprising:
    a deck;
    a motor plate to which a spindle motor is fixed;
    at least one pressing screw which is coupled to said deck by passing through said motor plate;
    a spring which is disposed between said pressing screw and said motor plate to bias said motor plate toward said deck; and
    tilt adjusting screws screw-threaded to said deck and contacting first and second side portions of a bottom surface of said motor plate, for lifting and lowering the side portions of said motor plate with respect to said deck.

2. An optical pickup tilt adjustable disk player as claimed in claim 1, wherein a hinge protrusion formed on said deck contacts the bottom surface of said motor plate at a contact point formed thereon, wherein the first and second side portions of said motor plate are lifted or lowered by pivoting around said contact point.

3. An optical pickup tilt adjustable disk player as claimed in claim 2, wherein said contact point is an embossment formed on the bottom surface of said motor plate to contact an end portion of said hinge protrusion.

4. An optical pickup tilt adjustable disk player as claimed in claim 2, wherein said tilt adjusting screws comprise:
    a tangential screw of which an end portion contacts the first side of the bottom surface of said motor plate for adjusting the tilt of said motor plate in a tangential direction; and
    a radial screw, installed to be perpendicular to said tangential screw with respect to said contact point, of which an end portion contacts the second side of the bottom surface of said motor plate for adjusting the tilt of said motor plate in a radial direction.

5. An optical pickup tilt adjustable disk player as claimed in claim 4, wherein embossments are formed on the bottom surface of said motor plate, each of which contact the respective end portions of said tangential screw and said radial screw.

6. An optical pickup tilt adjustable disk player as claimed in claim 1, further comprising:
    phase guiders, installed on said deck, for supporting the bottom of said motor plate; and
    a phase protrusion which is formed on said deck and inserted into a phase hole formed on said motor plate,
    whereby movement of said motor plate is restricted by said phase guiders and said phase protrusion.

* * * * *